US010538316B2

(12) United States Patent
Chen

(10) Patent No.: US 10,538,316 B2
(45) Date of Patent: Jan. 21, 2020

(54) MULTIFUNCTIONAL FLYING PLATFORM

(71) Applicant: Zhuhai Yuren Agricultural Aviation Co., Ltd., Zhuhai (CN)

(72) Inventor: Bo Chen, Zhuhai (CN)

(73) Assignee: ZHUHAI YUREN AGRICULTURAL AVIATION CO., LTD., Zhuhai (CN)

( * ) Notice: Subject to any disclaimer, the term of this patent is extended or adjusted under 35 U.S.C. 154(b) by 661 days.

(21) Appl. No.: 15/303,526

(22) PCT Filed: Jan. 27, 2016

(86) PCT No.: PCT/CN2016/000055
§ 371 (c)(1),
(2) Date: Oct. 12, 2016

(87) PCT Pub. No.: WO2016/155400
PCT Pub. Date: Oct. 6, 2016

(65) Prior Publication Data
US 2017/0029099 A1 Feb. 2, 2017

(30) Foreign Application Priority Data

Mar. 31, 2015 (CN) .................... 2015 2 0187840 U
Sep. 21, 2015 (CN) .................... 2015 2 0730921 U

(51) Int. Cl.
*B64C 27/08* (2006.01)
*B64C 39/02* (2006.01)
(52) U.S. Cl.
CPC ............ *B64C 27/08* (2013.01); *B64C 39/024* (2013.01); *B64C 2201/027* (2013.01); *B64C 2201/12* (2013.01); *B64C 2201/127* (2013.01); *B64D 2203/00* (2013.01)
(58) Field of Classification Search
CPC .............. B64C 39/024; B64C 2201/12; B64C 2201/02; B64C 2201/108; B64C 2201/126
See application file for complete search history.

(56) References Cited

U.S. PATENT DOCUMENTS

2006/0091258 A1* 5/2006 Chiu ..................... A45C 13/02
244/119
2009/0283629 A1 11/2009 Kroetsch et al.
2009/2836299 11/2009 Kroetsch et al.
(Continued)

FOREIGN PATENT DOCUMENTS

CN    201367115 Y    12/2009
CN    102490896 A    6/2012
(Continued)

*Primary Examiner* — Christopher P Ellis
(74) *Attorney, Agent, or Firm* — Gokalp Bayramoglu

(57) ABSTRACT

The present invention is aimed to provide a multi-functional flying platform with a simple structure, which is easy to operate and can achieve the mounting of different functional equipment. It includes rotor arm system and mounting plate (1). A plurality of evenly distributed fixing devices (2) are provided on the mounting plate (1). Mounting plate (1) is fixedly connected to rotor arm (3) of the rotor arm system by fixing device (2). A plurality of mounting positions (4) are provided on the lower side of the mounting plate (1). The present invention can be used in the field of agricultural aviation.

9 Claims, 17 Drawing Sheets

(56) References Cited

U.S. PATENT DOCUMENTS

| | | | |
|---|---|---|---|
| 2012/0083945 A1* | 4/2012 | Oakley | B64C 27/08 |
| | | | 701/2 |
| 2013/0068892 A1 | 3/2013 | Bin Desa et al. | |
| 2014/0231593 A1* | 8/2014 | Karem | B64C 1/0009 |
| | | | 244/45 R |
| 2016/0159471 A1* | 6/2016 | Chan | B64C 39/024 |
| | | | 244/39 |
| 2016/0244160 A1* | 8/2016 | Colten | B64C 39/024 |
| 2016/0272312 A1* | 9/2016 | Mallard | B64C 29/0033 |
| 2017/0129602 A1* | 5/2017 | Alduaiji | B25J 9/1679 |
| 2018/0273158 A1* | 9/2018 | Courtin | B64C 1/26 |
| 2018/0354625 A1* | 12/2018 | Verkade | B64D 9/00 |
| 2018/0362157 A1* | 12/2018 | Teetzel | B64C 39/024 |
| 2019/0061933 A1* | 2/2019 | Cappelleri | B64C 29/0025 |
| 2019/0168872 A1* | 6/2019 | Grubb | B64C 39/04 |

FOREIGN PATENT DOCUMENTS

| | | | | |
|---|---|---|---|---|
| CN | 203996882 U | 12/2014 | | |
| CN | 203996882 U | 12/2014 | | |
| CN | 203996888 U | 12/2014 | | |
| CN | 204197268 U | 3/2015 | | |
| JP | 2015-1450 | 1/2015 | | |
| WO | WO-2011149544 A1 * | 12/2011 | | A63H 27/04 |
| WO | WO2013/019210 | 2/2013 | | |
| WO | WO2014059549 A1 | 4/2014 | | |
| WO | WO-2014080386 A2 * | 5/2014 | | B64C 39/024 |

* cited by examiner

MULTIFUNCTIONAL FLYING PLATFORM

TECHNICAL FIELD

The present invention relates to an aircraft, and more particularly, to a multifunctional flying platform.

BACKGROUND

With the development of the technology, the agricultural mechanization is getting more and more improved. With the development of large-scale cultivation, the aircraft is used more and more to carry out the field work. For example, a flying spreader is used to spread seeds in the field or spread fertilizer during the crop growing season; an agricultural spraying Unmanned Aerial Vehicle (UAV) is used to spray pesticides to eliminate agricultural damage; and etc. However, there is a problem, i.e., when different jobs need to be performed, different types of UAV operations are required to work separately. For farmers, they need to set aside plenty space to accommodate different types of UAV. Also, a lot of money need to be invested in buying UAVs. In addition, maintenance costs are high. As a result, the cost for farmers greatly increases. If a flying platform which can carry different equipment with various functions can be provided, the farmer merely needs to buy one such platform. By altering the carried equipment, different jobs can be done. Thus, the growth of crops can be secured.

SUMMARY

The technical problem to be solved by the present invention is to overcome the deficiencies of the prior art, that is, to provide a flying platform with a simple structure, which is easy to operate and can carry different equipment with various functions.

The technical solution used by the present invention is: the present invention includes a rotor arm system and a mounting plate. The mounting plate is provided with a plurality of fixing devices. The mounting plate is fixedly connected to the rotor arm on the rotor arm system by the fixing devices. A plurality of mounting positions is provided on a lower side of the mounting plate.

T above solution reveals that by combining the rotor arm system and the mounting plate, the rotor arm system and the mounting plate are connected by fixing devices. According to different working requirements of the user, a different device with different functionality can be mounted on the mounting position, such as agricultural sprayers, agricultural spreader, a spectrometer, an imaging system, and a field transporter, and etc. As long as it is necessary, the equipment can be mounted and removed from the mounting position easily at any time, which significantly facilitates the operation of farmers, without any professional guide on site. A multi-purpose apparatus is achieved. The cost is notably reduced.

Furthermore, the fixing device includes an arc groove provided on the mounting plate and a clamping block with one end hinged to an edge of the arc groove. A tension rod with a cam handle and a clamping cone is provided on a non-hinged end of the clamping block. The cam handle is hinged to an upper end of the tension rod. A clamping groove is provided on the other side of the arc groove. A nested hole formed by fitting the arc groove with the clamping block matches the rotor arm.

The above technical solution reveals that, the fixing device uses a manner with a cam handle. Quick installation and removal can be achieved, which facilitates the replacement of equipment to be mounted. It is also easy to assemble and disassemble the rotor arm system. The storage and unfolding of the entire platform are also facilitated.

Furthermore, the mounting plate is provided on an upper side or a lower side of the rotor arm system, or between the rotor arms of the rotor arm system.

The above technical solution reveals that, the mounting plate is provided in various ways, which can be arranged as desired.

Furthermore, on the mounting plate, a horizontal position of the mounting position is lower than that of the fixing device. A plurality of hollow holes is provided on the mounting plate.

The above technical solution reveals that, for a non-planar mounting equipment, it can be mounted on the mounting plate with the non-planar structure according to the requirement of the equipment. The mounting is convenient. According to various demands of the farm work, desired functional devices can be mounted on the mounting position, such as an agricultural sprayer, agricultural spreader, a spectrometer, an imaging system, a field transporter, and etc. As long as it is necessary, the equipment can be mounted and removed from the mounting position easily at any time, which significantly facilitates the operation of farmers, without any professional guide on site. A multi-purpose apparatus is achieved. The cost of input is notably reduced. In addition, the horizontal position of the mounting position is provided relatively low, which can ensure the stability of the flying platform and the convenience of installing the mounting equipment. Meanwhile, the processing of the mounting plate is facilitated. Providing hollow holes reduces the weight of the mounting plate while ensuring the strength, so as to improve the mounting capacity of the flying platform.

Furthermore, a plurality of rotor arm grooves that are symmetrical with each other and match the rotor arms is provided on the mounting plate. The plurality of fixing devices and the plurality of rotor arm grooves are evenly and symmetrically distributed on the mounting plate and match the rotor arms on the rotor arm system.

The above technical solution reveals that, rotor arm grooves and fixing devices are used together to achieve the connection between the mounting plate and the rotor arm. First, this reduces the using of fixing devices, lowering the cost. Second, the assembly and disassembly efficiencies are increased by the matching manner of the rotor arm groove and the rotor arm. Third, the preparation of the mounting plate is easier, while reducing the using of fixing devices, indirectly lowering the cost.

Furthermore, the mounting plate and the rotor arms are all made of carbon fiber.

The above technical solution reveals that, using carbon fiber to make the platform, not only ensures its strength, but also significantly reduces its weight, so as to increase the weight that can be mounted.

Furthermore, the rotor arm system includes the rotor arm, a plurality of rotors provided on the rotor arm, and a controller provided in a central position of the rotor arms. Rotors are symmetrically provided on the rotor arm and located on an outer side of the rotor arms.

The above technical solution reveals that, the rotor arm system is simple in structure, light in weight, and easy for flying.

Furthermore, the mounting position can mount but not limited to an agricultural sprayer, an agricultural spreader, spectrometer, an imaging system, and a field transporter.

The above technical solution reveals that, a variety of device types can be mounted, and can be provided as necessary.

Furthermore, the multifunctional flying platform further includes a Pan-Tilt-Zoom (PTZ) and a ranging device. The ranging device is provided on the Pan-Tilt-Zoom. The ranging device is a microwave radar, an ultrasound or a laser ranging device. LED light pole is vertically provided above the controller. LED light strip is provided on the rotor arms. The ranging device, the LED light strip, and the LED light pole are electronically connected to the controller.

The above technical solution reveals that, with the controller, unmanned flying can be achieved. Moreover, the design of the microwave radar, the ultrasound or the laser ranging device, the ground profile copying flying and avoiding obstacles can be realized. It can be used easily on the land with multiple obstacles, so as to ensure the safe flying of flying platform. With the design of LED light strips and LED light poles, it is possible to determine the amount of the insecticide liquid, the amount of the power supply, and the direction of flying, according to the twinkling. Manipulation of the flying platform by the operator is improved, such that safe flying is achieved.

Furthermore, the rotor arm is a pipe. An electrical speed controller (ESC) is provided in the rotor arm. A motor in a base of the rotor includes air holes communicated with the interior of the rotor arm. Ventilation holes are provided at central positions of the rotor arm. ESC is located within the rotor arm between the air hole and the ventilation hole. The rotation of the motor of the rotor drives the air to enter the rotor arm from the ventilation hole, so as to cool down the ESC and the motor. Hot air is drawn from the air hole. The heat sink is provided around the ESC. The overall shape of the heat sink coincides with that of a cavity of the pipe. The orientation of the heat sink coincides with that of the pipe in which the ESC is provided.

The above technical solution reveals that, ESC is provided within the rotor arm, making the entire apparatus more beautiful. Also, it makes full use of the rotor. Space is saved. Further, the loss caused by exposing ESC outside the rotor is avoided. The structure of heat sink is designed to be suitable to mount inside the pipe. There is no need to mount a cooling fan on the ESC. Overall cost is reduced, and its structure is simple.

The beneficial effects of the present invention lie in that, according to various demands of the farm work, desired functional devices can be mounted on the mounting position, such as an agricultural sprayer, an agricultural spreader, a spectrometer, an imaging system, a field transporter, and etc. As long as it is necessary, the equipment can be mounted and removed from the mounting position easily at any time, which significantly facilitates the operation of farmers, without any professional guide on site. A multi-purpose apparatus is achieved. The cost of input is notably reduced.

DETAILED DESCRIPTION OF THE INVENTION

Figure 1:
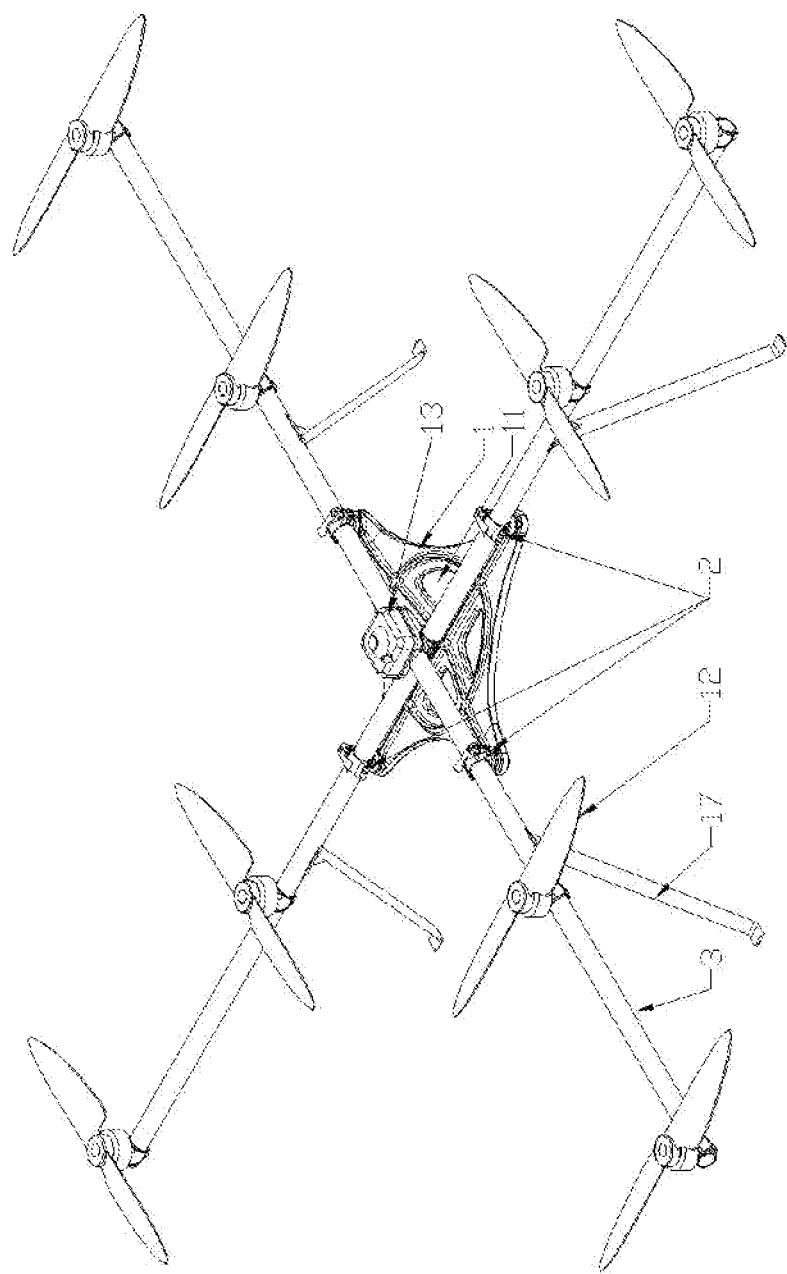
FIG. 1 is a simplified structural schematic view of a first structure of the present invention.
Figure 2:
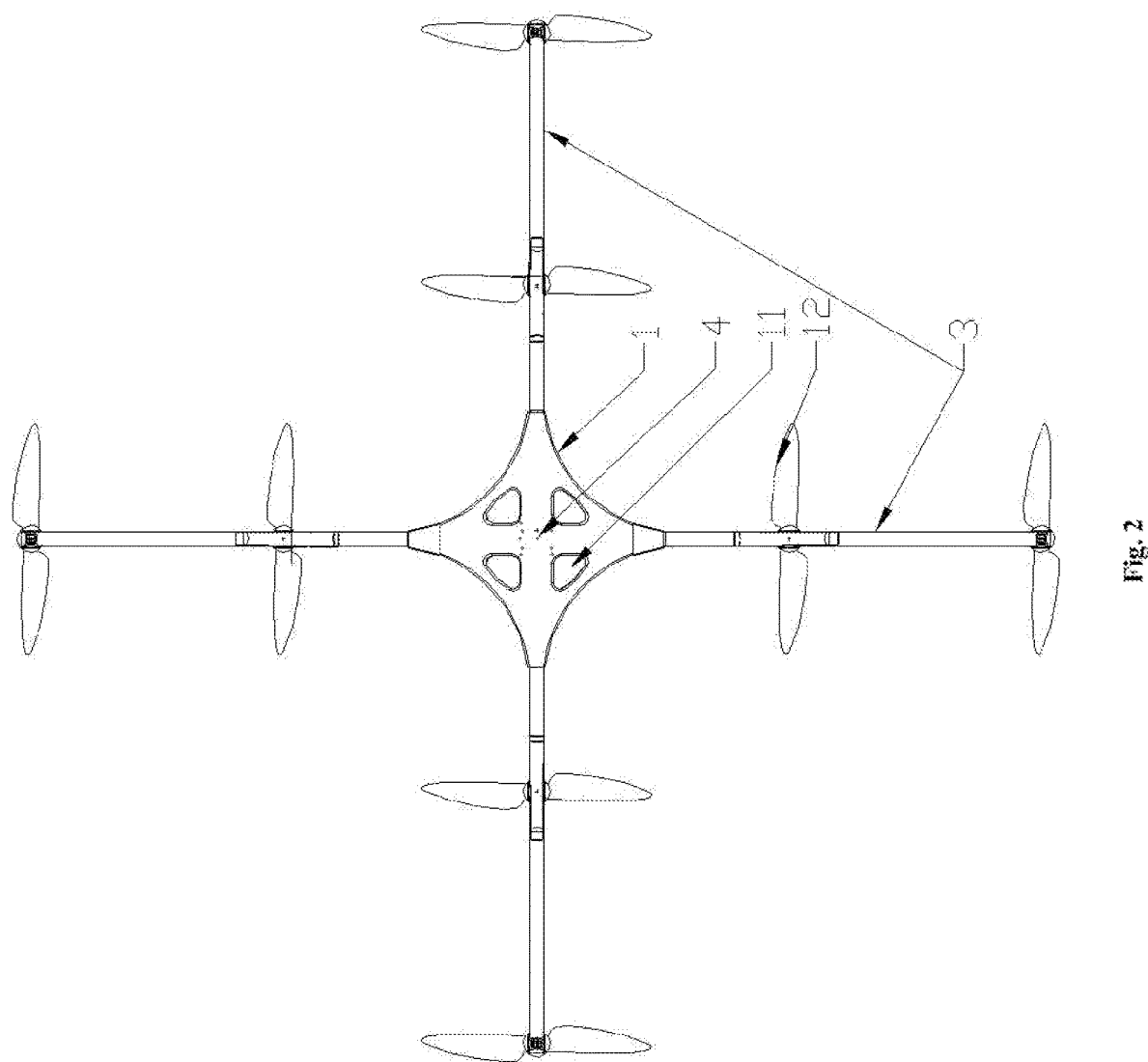
FIG. 2 is a simplified structural schematic bottom view of the first structure of the present invention.
Figure 3:
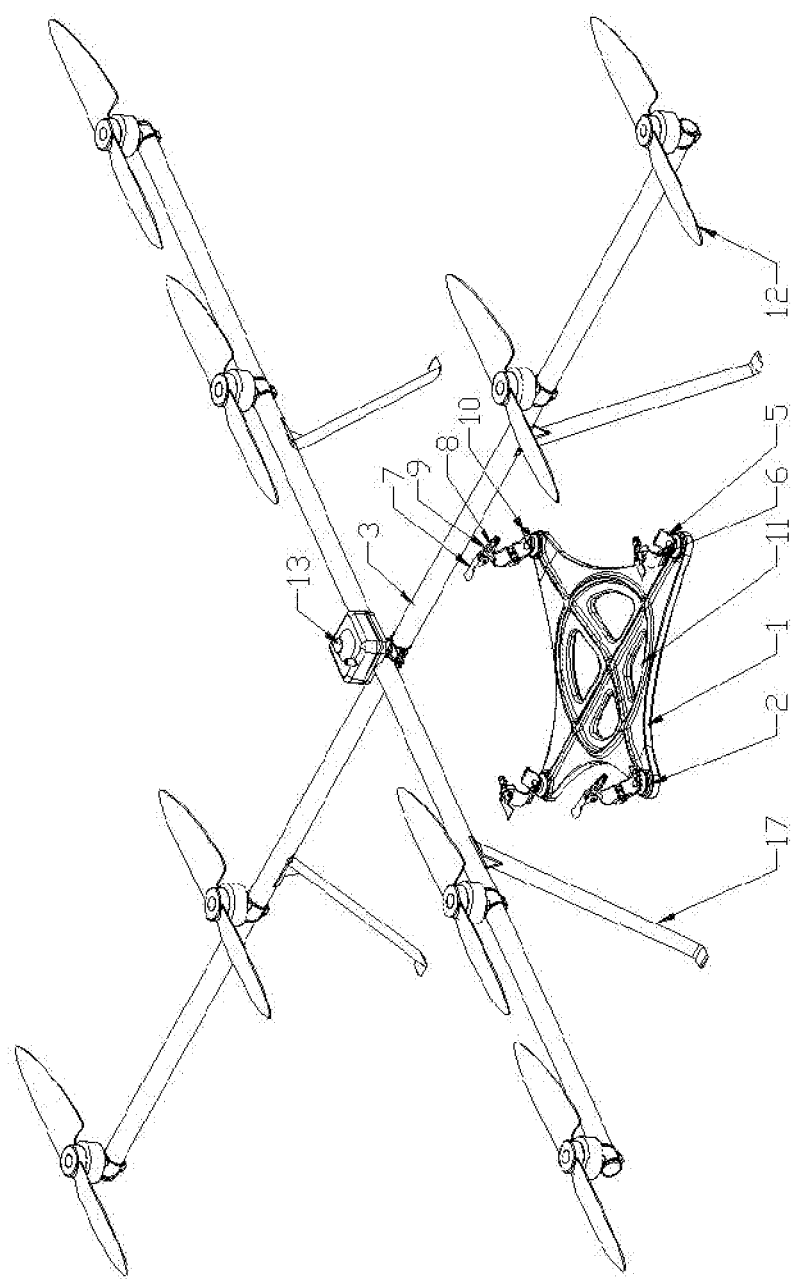
FIG. 3 is an exploded view of the first structure of the present invention in the first status.

As shown in FIG. 1 to FIG. 4, the system of the present invention includes a rotor arm system and a mounting plate 1. Mounting plate 1 is provided with a plurality of evenly distributed fixing devices 2. Mounting plate 1 is fixedly connected with rotor arm 3 on rotor arm system 142 via fixing device 2. A plurality of mounting positions 4 that are used to mount different equipment is provided on the lower side of mounting plate 1. In the present invention, a rotor arm system with four rotors is formed by two crossover rotors. Alternatively, a rotor arm system with six rotors or a rotor arm system with eight rotors can be formed, if necessary. On the mounting plate, the number of fixing devices 2 is the same as that of the rotor arms.

In other situation, as shown in FIG. 8 to FIG. 10, and FIG. 15, mounting plate 1 is further provided with a plurality of rotor arm grooves 18 that are symmetrical with each other and matching rotor arm 3 The plurality of fixing device 12 and the plurality of rotor arm grooves 18 are distributed evenly and symmetrically on mounting plate 1, and match rotor arm 3 on rotor arm system 3. On the same rotor arm, is fixedly connected by two fixing devices 2 symmetrically provided on mounting plate 1. On another adjacent rotor arm, is connected in a matching manner by two rotor arm grooves 18 symmetrically provided on mounting plate 1. When the rotor arm system is a rotor arm system with four rotors, which is formed by two rotor arms provided in a crossover manner, one of rotor arms is fixed by fixing device 2, and the other rotor arm is fixed by rotor arm groove 18. When the rotor arm system is a rotor arm system with six rotors, which is formed by three rotors provided in a crossover manner, two of the rotor arms are fixed by fixing device 2, and the other rotor arm is fixed by rotor arm groove 18. When the rotor arm system is a rotor arm system with eight rotors, which is formed by three rotors provided in a crossover manner, two of the rotor arms are fixed by fixing devices, and the other two rotor arms are fixed by rotor arm groove 18. Those can be arranged as needed. The mounting plate 1 is provided on the upper side of the rotor arm system, on the lower side of the rotor arm system, or in-between the rotor arms of the rotor arm system. Mounting plate 1 may be provided in various ways as needed.

Said fixing device 2 includes an arc groove 5 provided on mounting plate 1 and a clamping block 6 hinged on the edge of arc groove 5. The non-hinged free end of clamping block 6 is provided with a tension rod 9 which has a cam handle 7 and clamping cone 8. Cam handle 7 hinges with the upper end of tension rod 9. A clamping groove 10 is provided on the other side of arc groove 5. The nested hole which is formed after arc groove 5 fits clamping block 6 matches rotor arm 3. Arc groove 5 is composed of first groove 51 and second groove 52. First groove 51 hinges with clamping block 6. Second groove 52 hinges with the base the fixing device. Clamping groove 10 is provided on the end of second groove 52.

On mounting plate 1, the horizontal position provided for mounting position 4 is lower than that of fixing device 2. That is, the middle portion of mounting plate 1 is lower than outside portion, which facilitates mounting and demounting of carried equipment. Moreover, a plurality of hollow holes 11 is provided on mounting plate 1. Hollow holes are provided to reduce net weight of the flying platform, so as to facilitate the flying and save the energy. Mounting plate 1 and rotor arm 3 are all made of carbon fiber. The rotor arm system includes a rotor arm 3, a plurality of rotors 12 provided on rotor arm 3, and a controller 13 provided on central position of rotor arm 3. Rotors 12 are provided symmetrically on rotor arm 3 and located on outside side of rotor arm 3. Rotor arm 3 is also provided with support leg 17. Support leg 17 can be implemented as a support leg with an oblique straight rod, or can be implemented as a support leg with a curved portion having a buffer function. Rotor arm groove 18 overlaps support leg 17, and then is fixed to rotor arm 3. As is shown in FIG. 8-15.

The platform also includes a Pan-Tilt-Zoom (PTZ) and a ranging device. The ranging device is provided on the Pan-Tilt-Zoom. The ranging device is a microwave radar, ultrasound or laser ranging device. LED light pole is provided vertically above controller 13. LED light strip 35 is provided on rotor arm 3. The ranging device, LED light strip 35, and LED light pole are electrically connected to controller 13. LED light strip 35 is a full-color LED light strip. By the twinkling or color alternating of LED light pole and LED light strip 35, the remaining of the insecticide, the remaining of the power supply 13, the ambient temperature of the ESC (electronic speed control), and etc. can be indicated. Meanwhile, the flying attitude and data of spray can be identified by LED light pole and LED light strip 35.

Rotor arm 3 is a pipe. ESC 29 is provided within rotor arm 29. Air holes that are in communication with the interior of rotor arm 3 are reserved in the motor in the base of the rotor 12. Ventilation holes are located at the middle position of rotor 3. ESC is located inside the rotor arm 3 between air holes and ventilation holes. The motor of rotor 12 rotates to let the air flow into the rotor arm 3 through ventilation holes, so as to cool down ESC 29 and the motor. Hot air is extracted from air holes. The heat sink 30 is provided around ESC 29. The overall shape coincides with that of the inner cavity of the pipe inside rotor arm 3. The orientation of heat sink 30 coincides with that of the rotor arm pipe where ESC 29 is provided. Therefore, the centrifuge wind generated by rotating of the motor in the rotor can cool down the ESC provided inside the pipe. ESC 29 is provided inside the pipe, which can save the space. After finishing the work, it can be washed with water.

Figure 16:
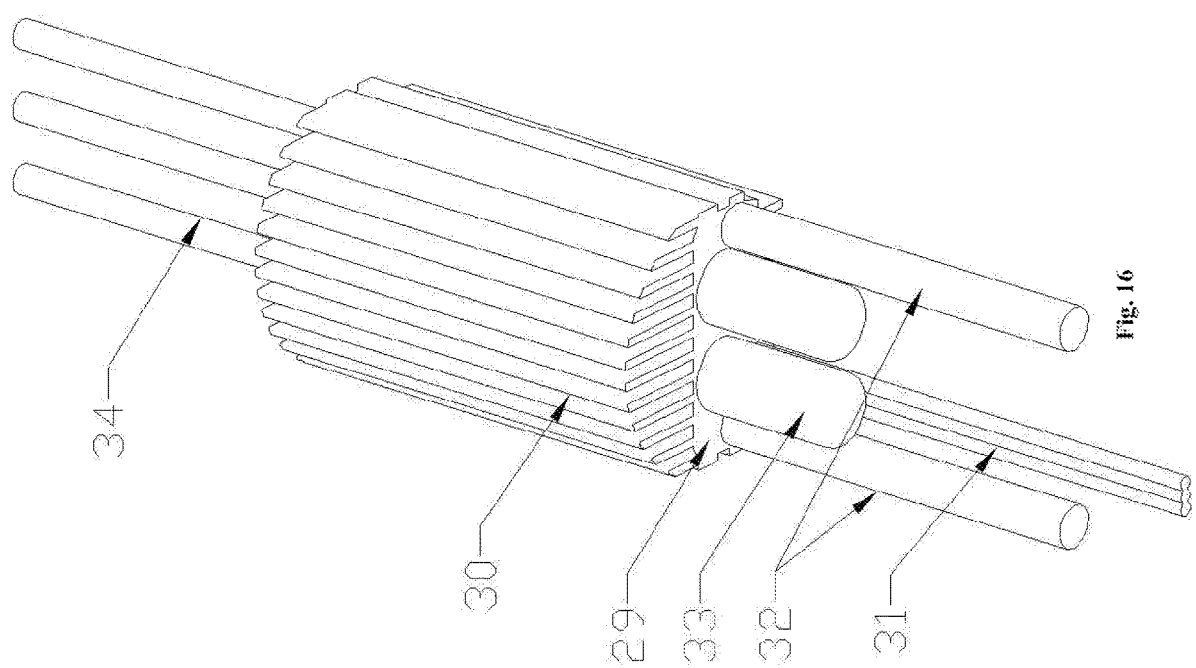
FIG. 16 is a stereoscopic structural schematic view of ESC.
Figure 17:
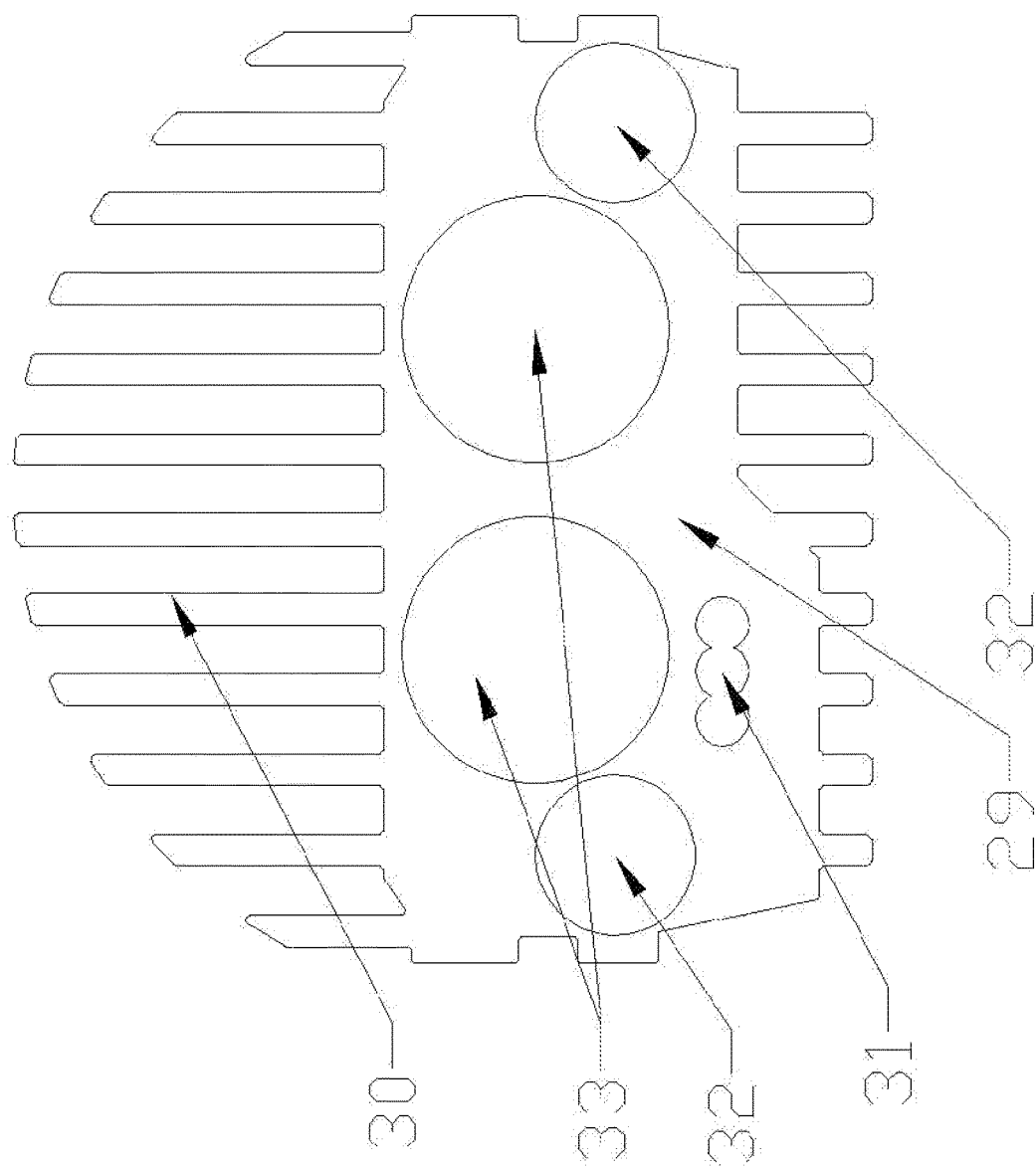
FIG. 17 is an end view of ESC.

As shown in FIGS. 16 and 17, power supply wire 31, control wire 32, capacitor 33, and output wire 34 are provided on ESC 29. Power supply wire 31, control wire 32, and capacitor 33 are located on the same end of ESC 29. Output wire 34 is located on the other end of ESC 29. Such separated designed structure can ensure that the wiring error does not occur when installing. Thus, the safety of ESC 29 is secured. Under the new situation, ESC 29 of the flying platform is located in the pipe. With the structure of heat sink 30, its cooling function is ensured. After ESC 29 is installed into the pipe, the entire flying platform is more artistic in appearance, lighter in weight, and can be directly waterproof, anti-corrosion and anti-collision, and has protective effects.

Figure 4:
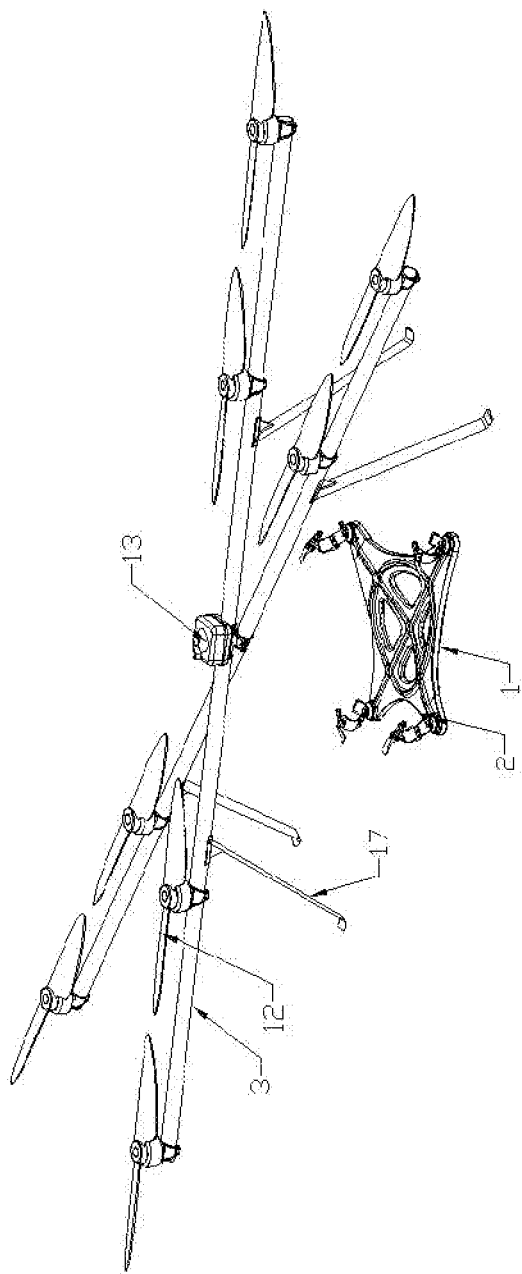
FIG. 4 is an exploded view of the first structure of the present invention in the second status.
Figure 10:
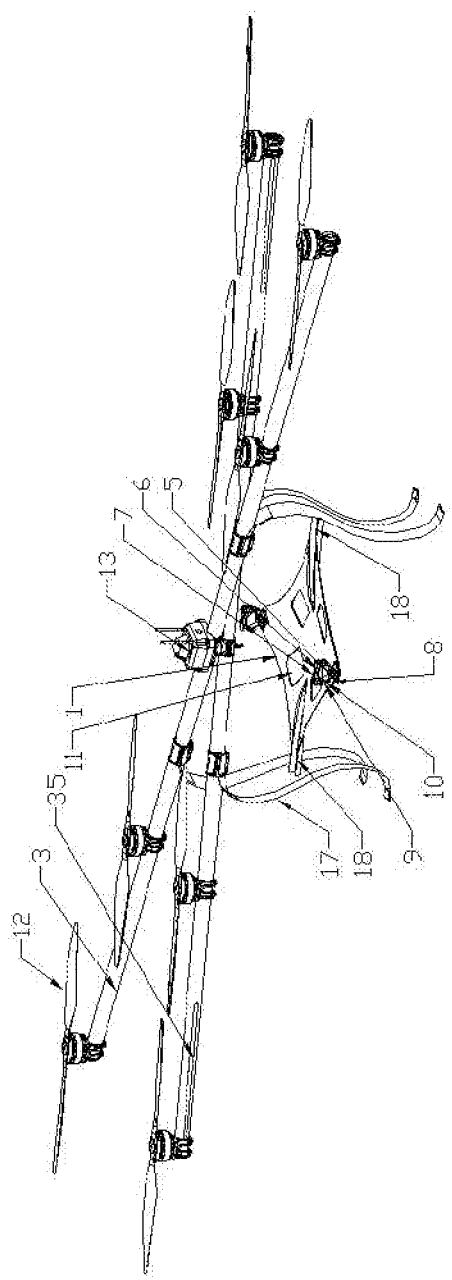
FIG. 10 is an exploded view of the second status of the second structure of the present invention.

After completing the work, mounting plate 1 can be detached and separated from the rotor arm system separated rotor arm system. The detached rotor arm system can make the rotor arm be folded. The folded machine can save the space, so as to improve the space utilization for farmers, as shown in FIGS. 4 and 10.

Hereinafter, the present invention is further illustrated by the following specific examples.

EXAMPLE ONE

Figure 14:
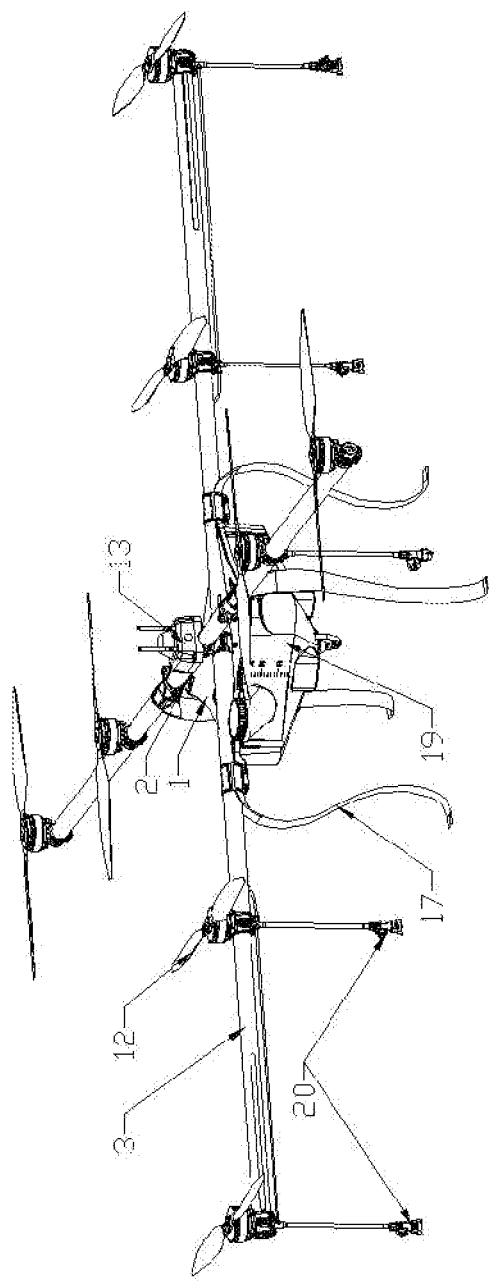
FIG. 14 is a simplified structural schematic view of the second structure in Example One.
Figure 15:
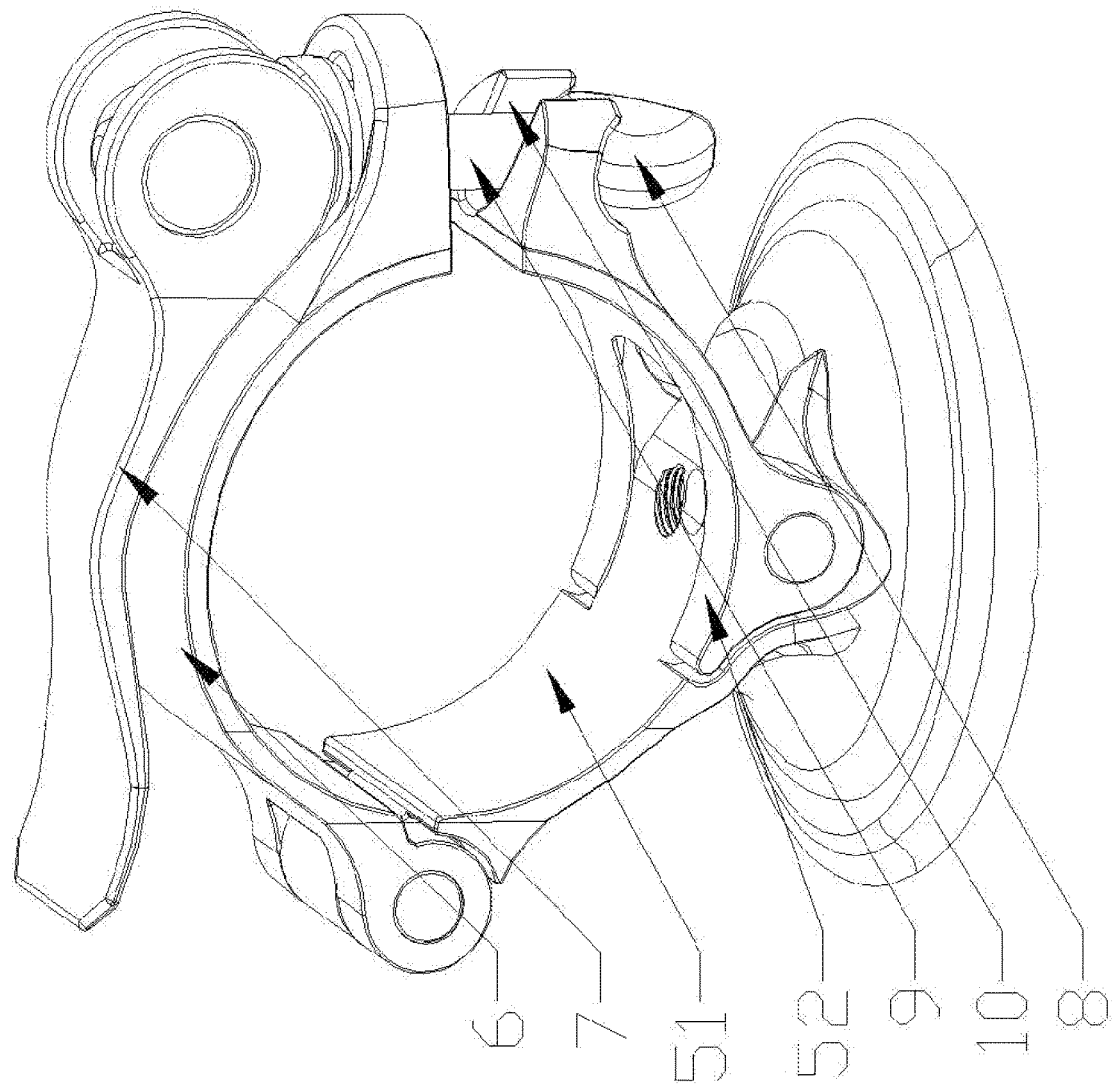
FIG. 15 is a simplified structural schematic view of a second structure of the fixing device.

As shown in FIG. 14, agricultural insecticide spraying device 19 is mounted on mounting device 4, which can be used in pesticide spraying in the field. It is avoided for farmers to walk through the field. At this time, nozzle 20 which is in communication with agricultural insecticide spraying device 19 is provided under rotor 12 located on rotor arm 3. During the spraying of pesticides, with the airflow generated by the rotation of rotor 12, insecticide sprayed by nozzle 20 has a greater kinetic energy and a good ability of penetrating. The pesticide can reach the under layer of crops to kill pests, such that crops are protected.

EXAMPLE TWO

Figure 5:
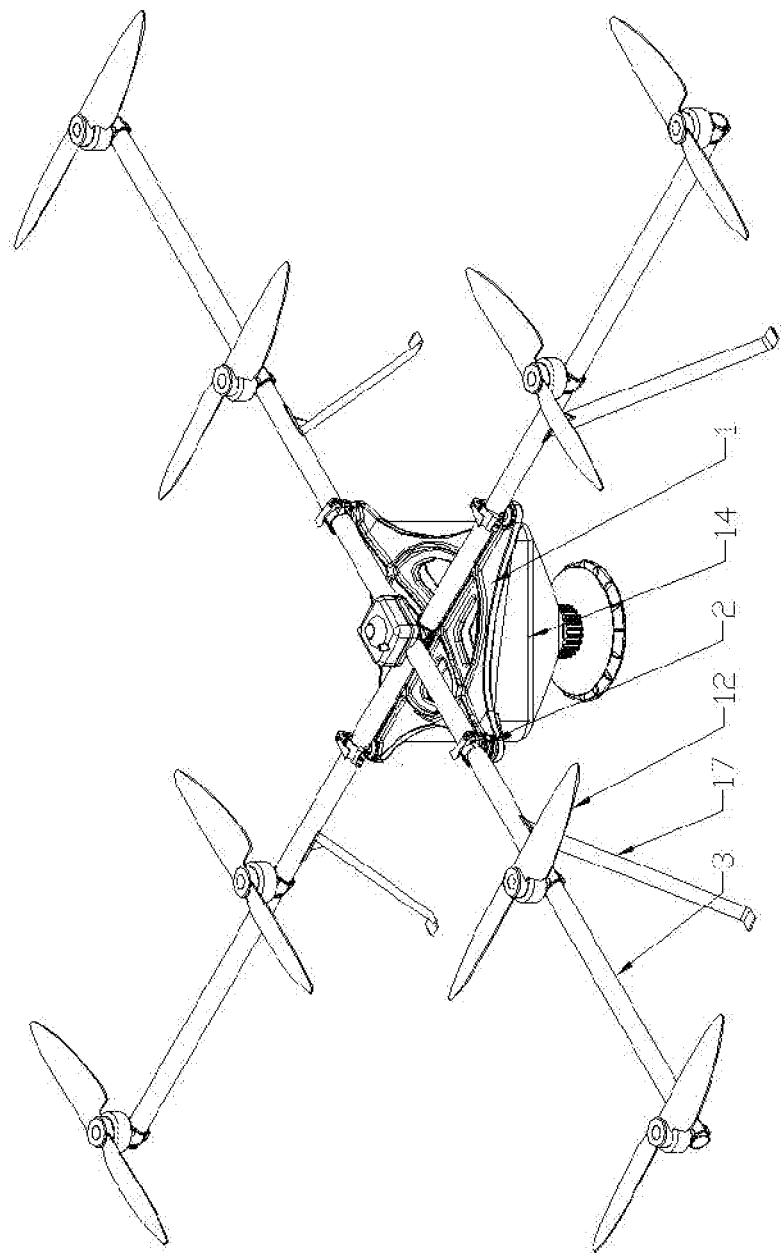
FIG. 5 is a simplified structural schematic view of the first structure in Example Two.
Figure 11:
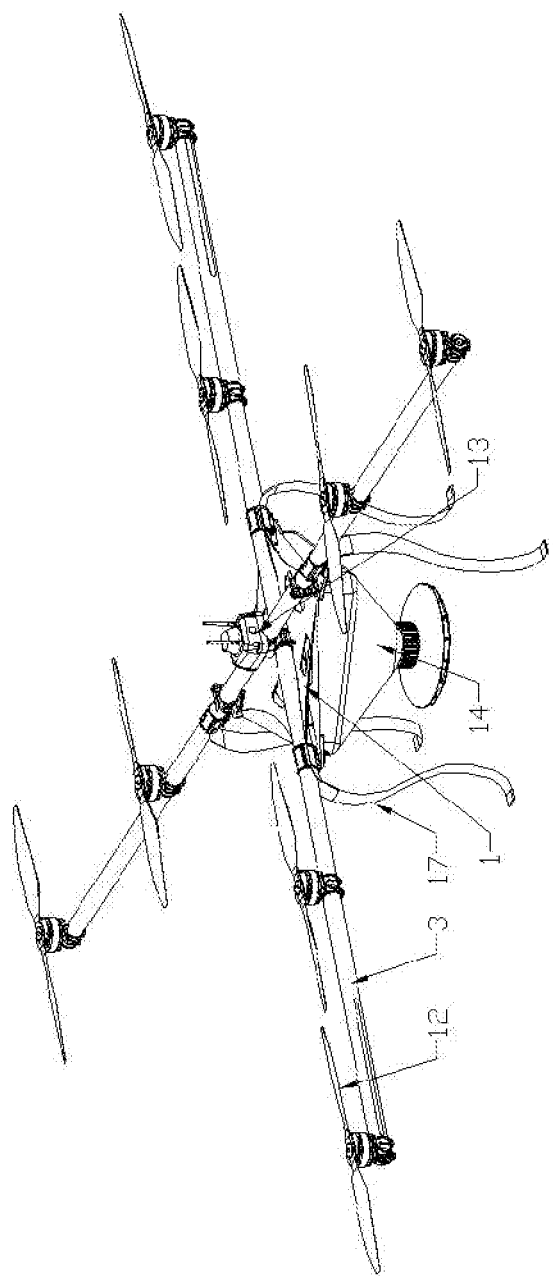
FIG. 11 is a simplified structural schematic view of the second structure in Example Two.

As shown in FIGS. 5 and 11, agricultural spreading device 14 is mounted on mounting position 4, such that it can be used for spreading seeds or fertilizer.

EXAMPLE THREE

Figure 6:
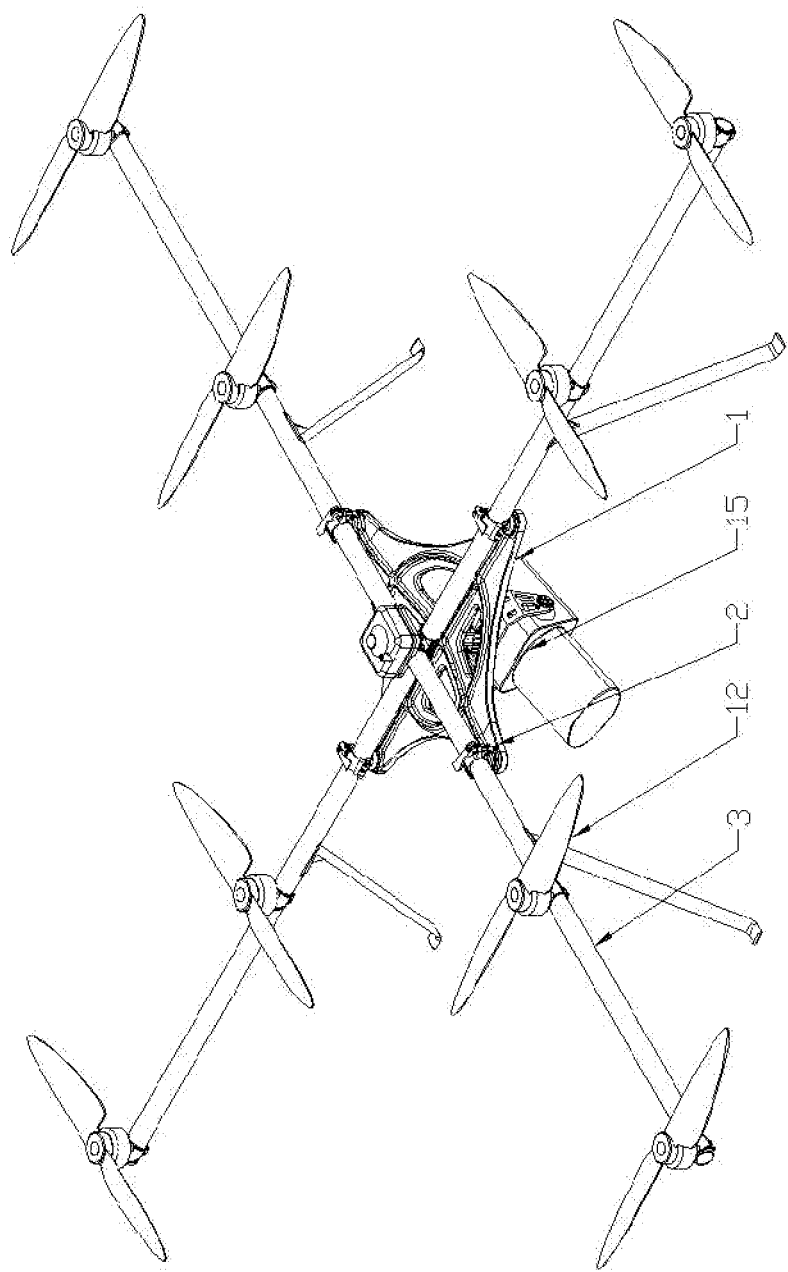
FIG. 6 is a simplified structural schematic view of the first structure in Example Three.
Figure 12:
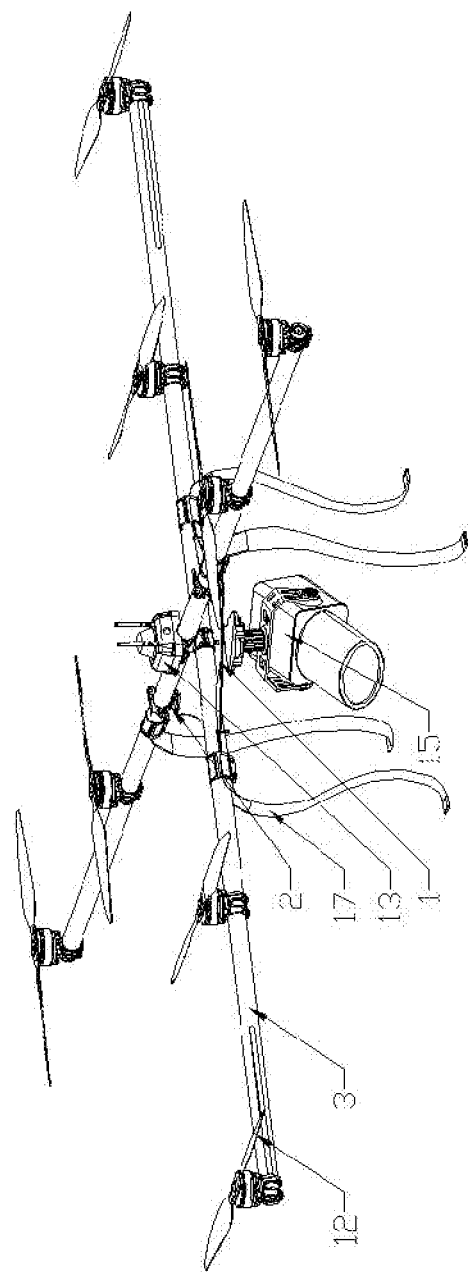
FIG. 12 is a simplified structural schematic view of the second structure in Example Three.

As shown in FIGS. 6 and 12, spectrometer 15 may be mounted on mounting position 4. The growth information of crops in the field can be collected by the spectrometer.

EXAMPLE FOUR

An imaging system may be mounted on mounting position, such that an actual scene in the field can be obtained.

EXAMPLE FIVE

Figure 7:
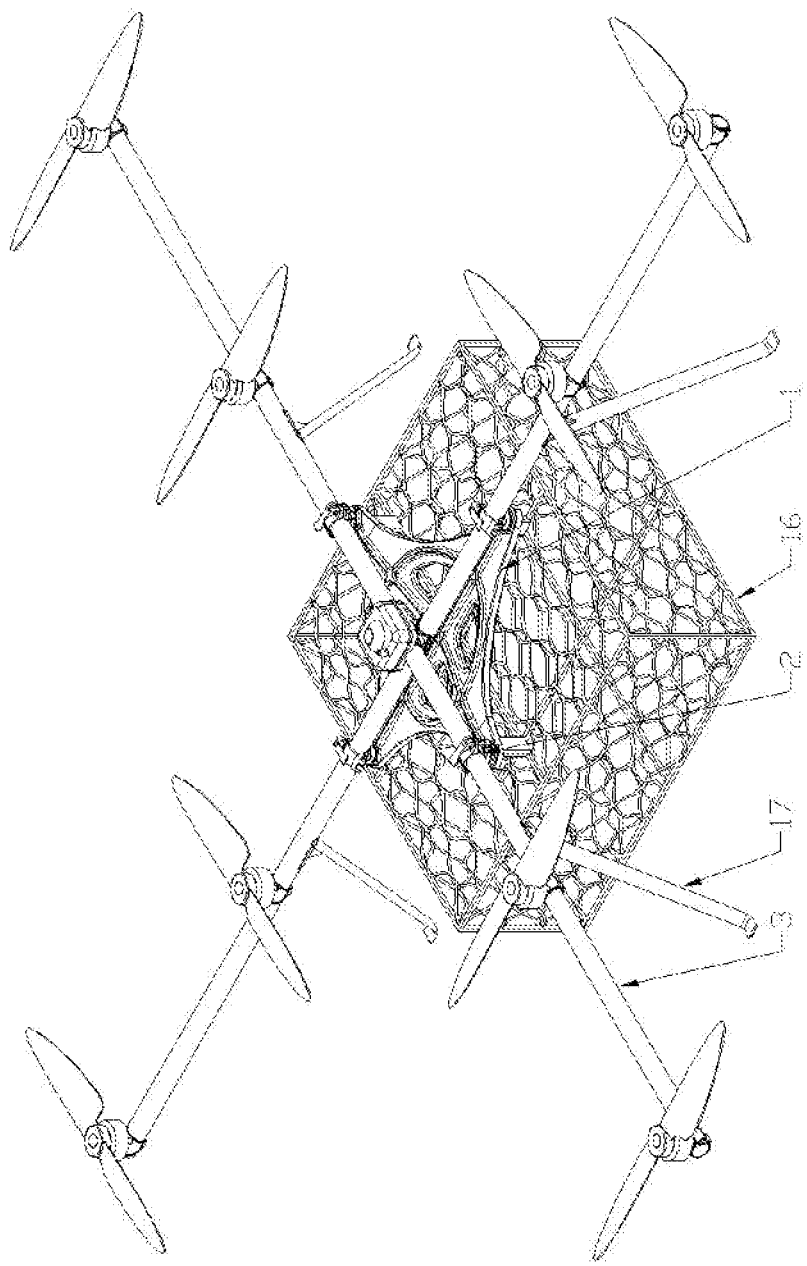
FIG. 7 is a simplified structural schematic view of the first structure in Example Five.
Figure 8:
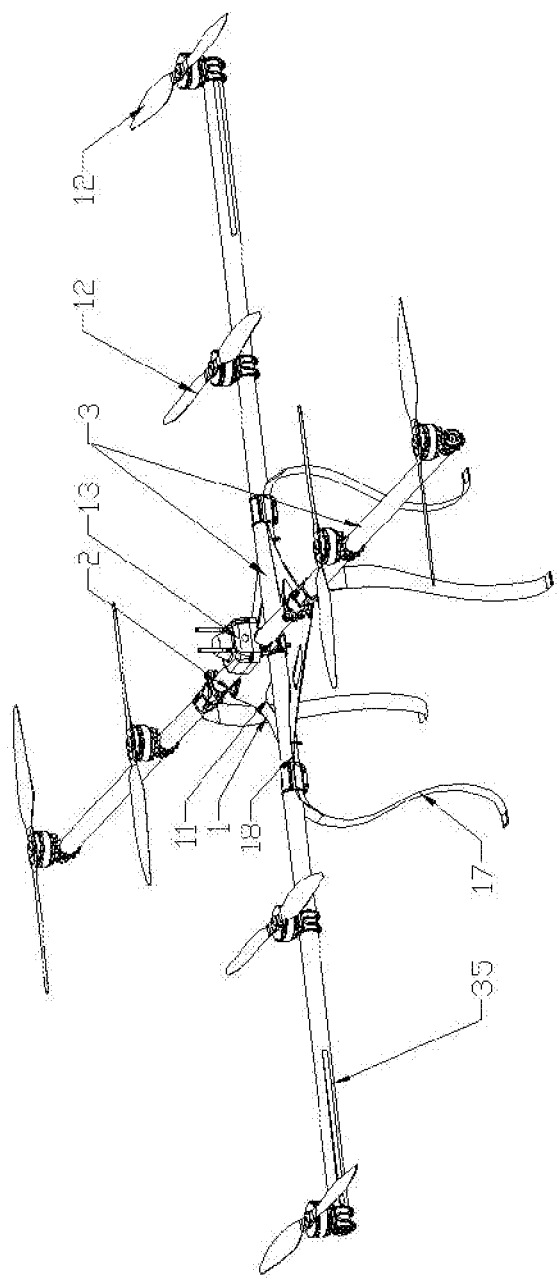
FIG. 8 is a simplified structural schematic view of a second structure of the present invention.
Figure 9:
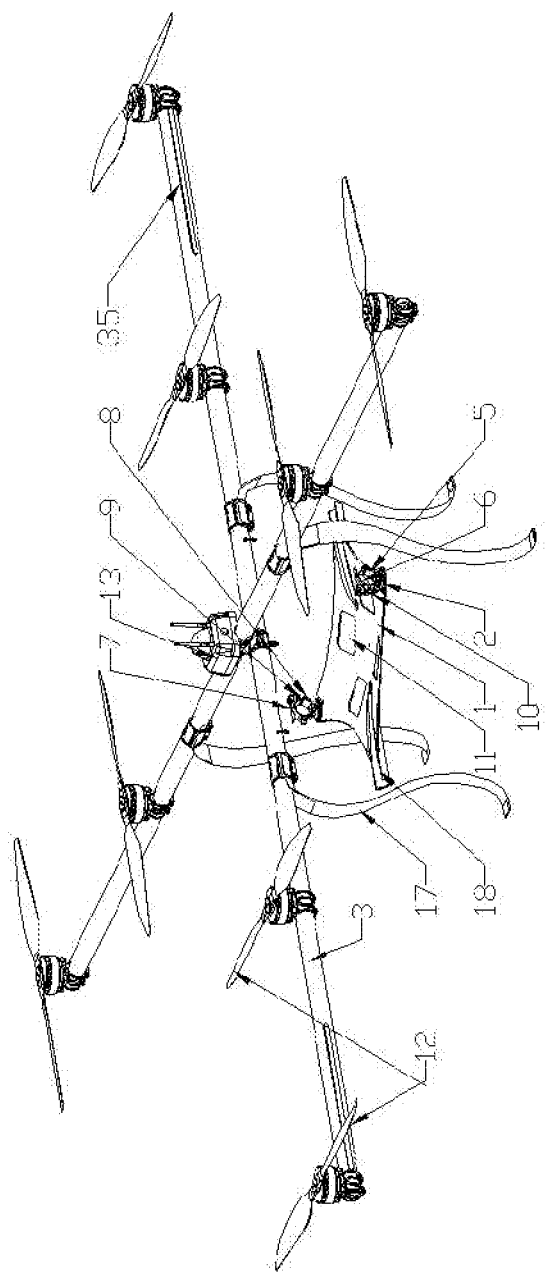
FIG. 9 is an exploded view of the first status of the second structure of the present invention.
Figure 13:
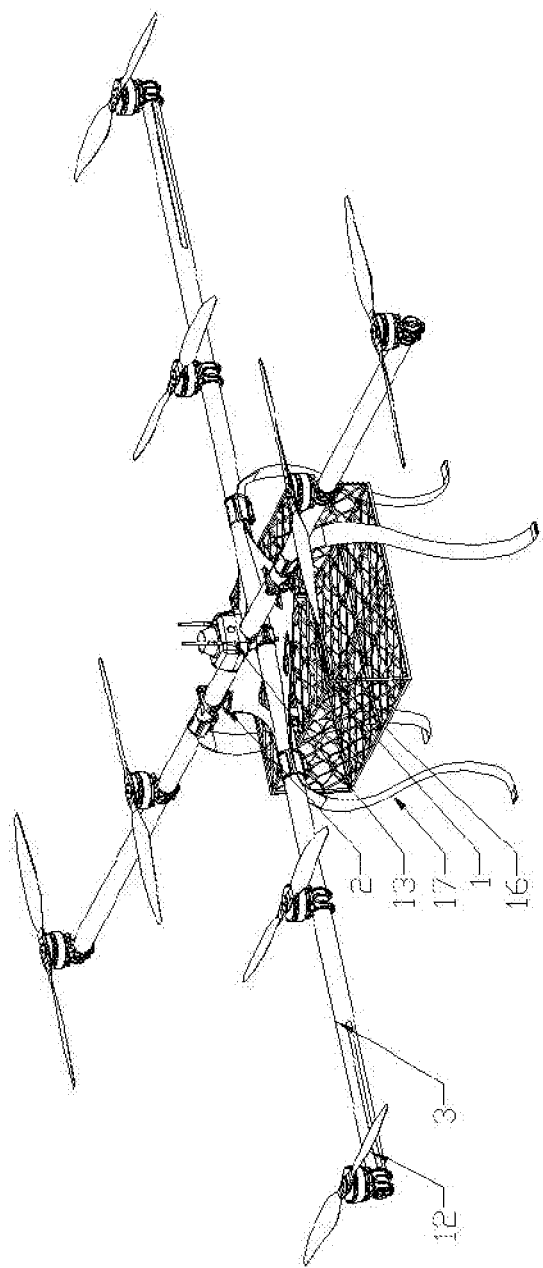
FIG. 13 is a simplified structural schematic view of the second structure in Example Five.

As shown in FIGS. 7 and 13, field transporter 16 may be mounted on mounting position 4. Transportation in the field can be done with the field transporter, reducing labor intensity of farmworkers.

The present invention uses the rotor arm system and the mounting plate. The mounting plate is provided with a plurality of evenly distributed fixing devices, or is provided with fixing devices and rotor arm grooves at the same time. The mounting plate is fixedly connected to the rotor arm of the rotor arm system by the fixing device and/or the rotor arm groove. A plurality of mounting positions that is used to mount different equipment is provided on the lower side of the mounting plate. According to various demands of the farm work, desired functional devices can be mounted on the mounting position, such as an agricultural sprayer, an agricultural spreader, a spectrometer, an imaging system, a field transporter, and etc. As long as it is necessary, the equipment can be mounted and removed from the mounting position easily at any time, which significantly facilitates the operation of farmers, without any professional guide on site. A multi-purpose apparatus is achieved. The cost of input is notably reduced.

The present invention can be used in the field of agricultural aviation.

What is claimed is:

1. A multifunctional flying platform, the platform comprising a rotor arm system and a mounting plate, the mounting plate being provided with a plurality of fixing devices, the mounting plate being fixedly connected to the rotor arm on the rotor arm system by the fixing devices, a plurality of mounting positions being provided on a lower side of the mounting plate;

wherein, a plurality of rotor arm grooves is symmetrical with each other and match the rotor arms, the plurality of rotor arm grooves being provided on the mounting plate, the plurality of fixing devices and the plurality of rotor arm grooves being evenly and symmetrically distributed on the mounting plate and matching the rotor arms on the rotor arm system.

2. The multifunctional flying platform, the platform comprising a rotor arm system and a mounting plate, the mounting plate being provided with a plurality of fixing devices, the mounting plate being fixedly connected to the rotor arm on the rotor arm system by the fixing devices, a plurality of mounting positions being provided on a lower side of the mounting plate; each of the plurality of fixing devices comprising an arc groove provided on the mounting plate and a clamping block with one end being hinged to an edge of the arc groove, a tension rod with a cam handle and a clamping cone being provided on a non-hinged end of the clamping block, the cam handle being hinged to an upper end of the tension rod, a clamping groove being provided on an other side of the arc groove, a nested hole formed by fitting the arc groove with the clamping block, the nested hole matching the rotor arm.

3. The multifunctional flying platform according to claim 2, wherein, a horizontal position of the mounting position on the mounting plate is lower than that of the fixing device, a plurality of hollow holes being provided on the mounting plate.

4. The multifunctional flying platform according to claim 1, wherein, the mounting plate is provided on an upper side or a lower side of the rotor arm system, or between the rotor arms of the rotor arm system.

5. The multifunctional flying platform according to claim 1, wherein, the mounting plate and the rotor arms are all made of carbon fiber.

6. The multifunctional flying platform according to claim 1, wherein, the rotor arm system comprises the rotor arm, a plurality of rotors provided on the rotor arm, and a controller provided in a central position of the rotor arms, the rotors being symmetrically provided on the rotor arm and located on an outer side of the rotor arms.

7. The multifunctional flying platform according to claim 6, wherein, the mounting position mounts but not limited to an agricultural sprayer, an agricultural spreader, spectrometer, an imaging system, and a field transporter.

8. The multifunctional flying platform according to claim 6, wherein, the multifunctional flying platform further comprises a Tilt-Pan-Zoom (TPZ) and a ranging device, the ranging device being provided on the TPZ, the ranging device being a microwave radar, an ultrasound ranging device, or a laser ranging device, an LED light pole being vertically provided above a controller, an LED light strip being provided on the rotor arms, the ranging device, the LED light strip, and the LED light pole being electronically connected to the controller.

9. The multifunctional flying platform according to claim 6, wherein, the rotor arm is a pipe, an electrical speed controller (ESC) being provided in the rotor arm, a motor in a base of the rotor having an air hole communicated with interior of the rotor arm, a ventilation hole being provided at a central position of the rotor arm, the ESC being located within the rotor arm between the air hole and the ventilation hole, the rotation of the motor of the rotor driving the air to enter the rotor arm from the ventilation hole to cool down the ESC and the motor, hot air being drawn from the air hole, a heat sink being provided around the ESC, an overall shape of the heat sink coinciding with that of a cavity of the pipe, the orientation of the heat sink coinciding with that of the pipe in which the ESC is provided.

* * * * *